Feb. 15, 1949.  L. LEE, II  2,461,827
COMBINATION PUMP AND VALVE MECHANISM
Original Filed March 26, 1945  3 Sheets-Sheet 1

INVENTOR.
LEIGHTON LEE II
BY
Lester W Clark
AGENT

Feb. 15, 1949. L. LEE, II 2,461,827
COMBINATION PUMP AND VALVE MECHANISM
Original Filed March 26, 1945 3 Sheets-Sheet 3

INVENTOR.
LEIGHTON LEE II
BY
Lester W Clark
AGENT

Patented Feb. 15, 1949

2,461,827

UNITED STATES PATENT OFFICE 2,461,827

COMBINATION PUMP AND VALVE MECHANISM

Leighton Lee, II, Rocky Hill, Conn., assignor, by mesne assignments, to Niles-Bement-Pond Company, West Hartford, Conn., a corporation of New Jersey Original application March 26, 1945, Serial No. 584,867. Divided and this application October 11, 1946, Serial No. 702,723

6 Claims. (Cl. 103—11)

1

This application is a division of application Serial No. 584,867, filed March 26, 1945.

The present invention relates to fluid pumping and flow controlling mechanism. Although it is illustrated herein as applied to a fuel supply system for an internal combustion engine, it should be apparent that its utility is general and that it is not limited to use in such a system.

An object of the present invention is to provide an improved unitary rotary pump and valve mechanism wherein the valve is rotated in unison with the pump, so that it may be freely translated by a small force without the possibility of sticking.

Another object is to provide an improved unitary rotary pump and valve mechanism wherein the valve is rotated in unison with the pump and is translated in response to the pressure of the fluid being pumped so as to control the flow of that fluid.

Figure 1:
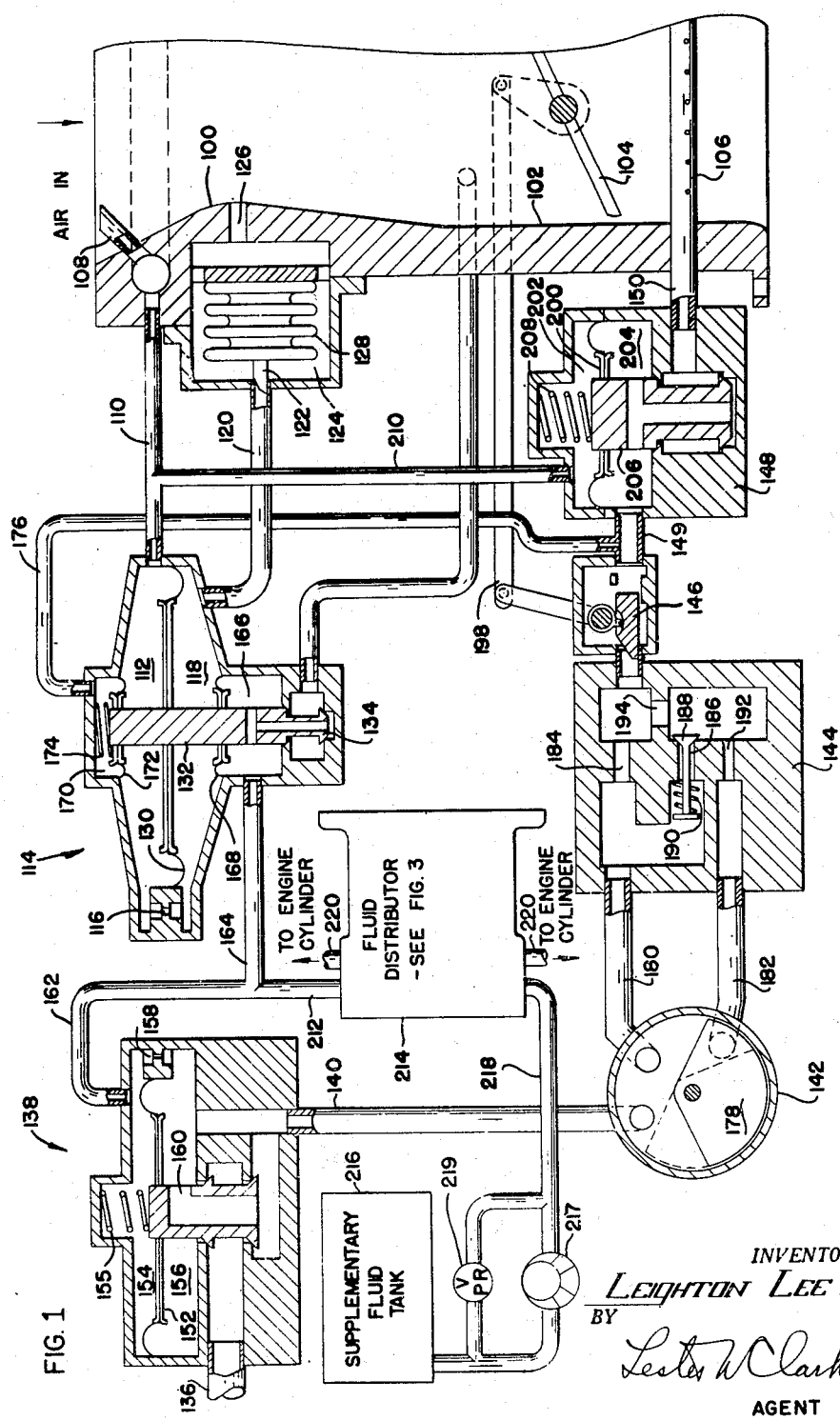
Figure 2:
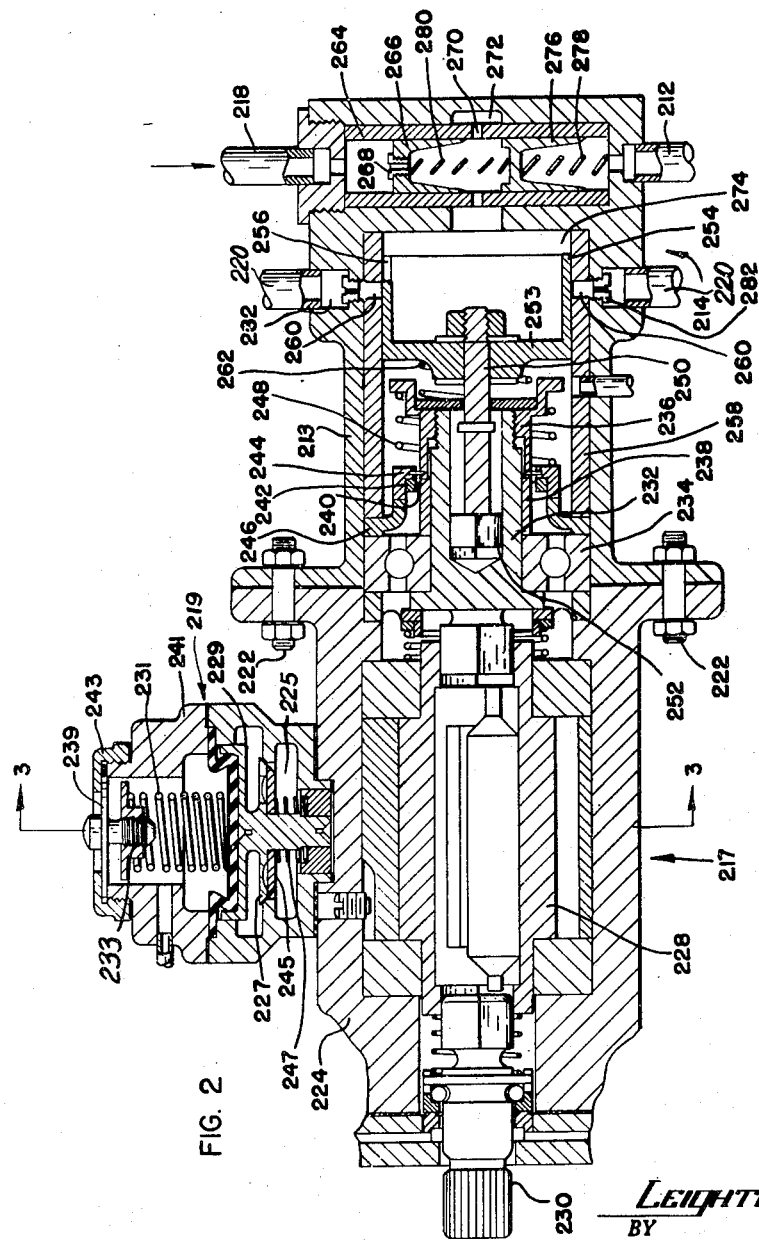
Figure 3:
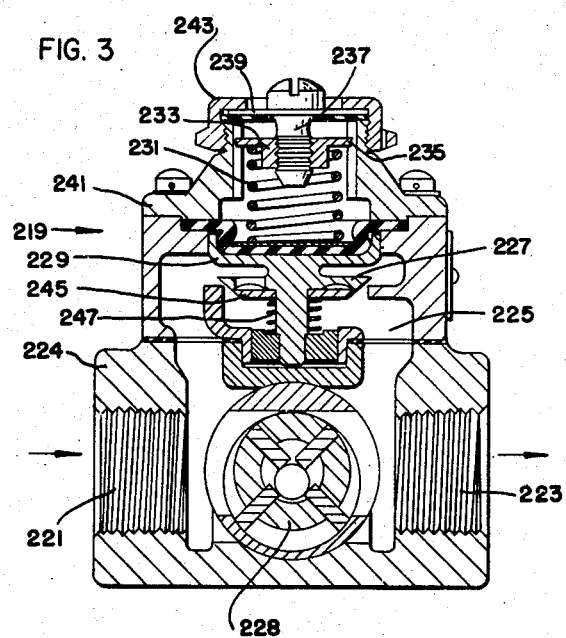
Figure 4:
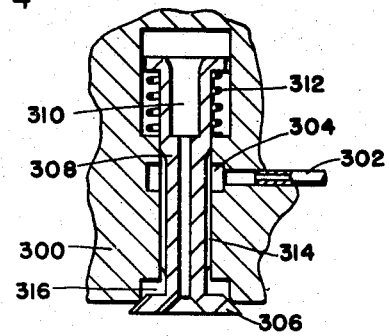

Other objects and advantages of the present invention will become apparent from a consideration of the appended specification, claims and drawing, in which Figure 1 illustrates, somewhat diagrammatically, a fuel supply system for an internal combustion engine, to which my invention may be applied, Figure 2 illustrates a combined pump and valve mechanism embodying my invention and adapted for use in the system of Figure 1, Figure 3 is a cross-sectional view taken on the line 3—3 of Figure 2, looking in the direction of the arrows, and Figure 4 is a cross-sectional view of a fuel injector nozzle which may be used with the system of Figure 1.

There is shown in Figure 1 a carburetor for an internal combustion engine equipped with a fluid distributor mechanism for supplying a supplementary fluid directly to the cylinders of the engine. The distributor itself is shown in detail in Figure 2.

In Figure 1, combustion air flowing to the engine passes through a venturi 100 and a passage 102 having a throttle 104 and a fuel discharge nozzle 106.

The air differential pressure created by the venturi 100 creates a flow of air through a secondary air passage which may be traced from impact tubes 108 through a conduit 110, a chamber 112 in a fuel meter generally indicated at 114, a restriction 116, another chamber 118, a conduit 120, past a valve 122, into a chamber 124 and thence through a conduit 126 to the throat of

2 venturi 100. The valve 122 is positioned by a bellows 128 mounted in the chamber 124. The function of the bellows 128 and the valve 122 is to reduce the total pressure differential produced by the venturi 100 by an amount sufficient to correct for changes in the temperature and density of air, so that the pressure drop appearing across restriction 116 is a measure of the mass of air flowing through the venturi 100 per unit time. The pressure drop across restriction 116 is applied to a diaphragm 130 which separates the chambers 112 and 118. The diaphragm 130 is attached at its center to the stem 132 of a pilot valve 134.

Fuel flowing to the engine comes from a suitable pump or other source of fuel under pressure and flows through a conduit 136, a flow controlling valve 138, a conduit 140, a mixture control 142, a jet system 144, an idle valve 146, a pressure regulating valve 148, and a conduit 150 to the fuel discharge nozzle 106.

The fuel flow regulator 138 includes a diaphragm 152, separating a pair of expansible chambers 154 and 156. These chambers are connected by a restriction 158. The diaphragm 152 is attached at its center to a valve 160, which controls the flow of fuel from conduit 136 into conduit 140. The chamber 156 is connected to conduit 140. The chamber 154 is connected through conduits 162 and 164 to a chamber 166 in the fuel meter 114.

The chamber 166 is separated from chamber 118 by a flexible diaphragm 168. The fuel meter 114 also includes a chamber 170 separated from chamber 112 by a diaphragm 172. A spring 174 biases the valve 134 toward closed position. The chamber 170 is connected through a conduit 176 to the conduit 149 on the downstream side of the jet system 144.

The mixture control 142 includes a disc valve 178, movable between the position shown in full lines in the drawing, hereinafter termed its lean position, and a position shown in dotted lines in the drawing, hereinafter termed its rich position.

When the mixture control valve 178 is in its lean position, fuel can flow from the mixture control 142 to the jet system 144 only through a conduit 180. When the mixture control valve 178 is in its rich position, fuel can flow to the jet system either through conduit 180 or through a conduit 182.

Fuel entering the jet system 144 through conduit 180 passes either through a fixed restriction 184 or through a restriction 186 controlled by an enrichment valve 188, biased to closed position by a spring 190. Fuel flowing to the jet system 144 through conduit 182 passes through a fixed restriction 192. Fuel flowing through the restrictions 186 and 192 also flows through a restriction 194.

The idle valve 146 is normally open, but moves toward its closed position as the throttle moves into a range of positions adjacent its closed position, so as to regulate the fuel flow. At such times, the air pressure differential set up by the venturi is an unreliable indication of the air flow. Therefore, it is considered better to increase the opening of valve 160 disproportionately to the air pressure differential set up by the venturi, and to regulate the fuel flow by means of the idle valve 146, which is connected to the throttle by means of a link 198. The disproportionate increase in the opening of valve 160 is secured by the use of the springs 155 and 174, which bias their associated valves in a fuel flow increasing direction.

The pressure regulator 148 includes a diaphragm 200 separating a pair of expansible chambers 202 and 204. The diaphragm 200 is attached at its center to a valve 206. A spring 208 biases the valve 206 toward closed position. The chamber 204 receives fuel from conduit 149. The chamber 202 is connected through a conduit 210 to the conduit 110.

The conduit 162 is connected through a conduit 212 to a fluid distributing and regulating mechanism illustrated in detail in Figure 2. The distributor 214 receives fluid to be distributed to the cylinders of the engine from a tank 216 thru a pump 217 and a conduit 218. A pressure relief valve 219 is provided to maintain a substantially constant discharge pressure at the pump 217. The distributor 214 distributes the fluid to lines 220 leading to the respective engine cylinders, in quantities determined by the pressure in conduit 212.

The pump 217 and the distributor 214, which are shown diagrammatically in Figure 1, are set forth in detail in Figures 2 and 3. The distributor 214 is built in a housing 213 attached by means of bolts 222 to a housing 224 containing the pump 217, of generally conventional design. The pump 217 includes a rotor 228 driven by a shaft 230, which is splined at its end so that it may be readily driven thru a suitable connection from the engine.

The pump receives fuel thru an inlet connection 221 and discharges it thru an outlet 223. The pump discharge pressure is regulated by a relief valve generally indicated at 219. Fluid at the pump discharge pressure flows into a relief passage 225, where it acts upwardly on the under side of a valve 227. The upper surface of valve 227 is attached to a guide 229. The guide 229 and valve 227 are biased in a valve closing direction by a spring 231. The upper end of spring 231 acts against a retainer nut 233, which is held against rotation by diametrically opposite projections 235, which slide in grooves in the valve cover 241. The nut 233 is vertically adjustable to vary the spring tension by means of a screw 237 on which the nut 233 is threaded. The screw 237 is provided with a flange 239 which may be clamped between the valve cover 241 and a locking cap 243 to hold the nut 233 in any adjusted position. The valve 227 and guide 229 are balanced against pump inlet pressure.

A by-pass valve 245 is provided in the form of a thin disk biased upwardly against the under side of valve 227 by means of a spring 247. The disk valve 245 closes apertures in the valve 227. If for any reason the pump inlet pressure becomes greater than the discharge pressure, the valve 245 opens, allowing fluid to by-pass the pump. This arrangement is useful when two pumps are connected in series in a fluid line. If one pump fails to operate for some reason, the by-pass valve on that pump opens to allow the other pump to move fuel past it.

If the pump discharge pressure tends to increase above the value established by the force of spring 231, the relief valve opens, allowing part of the fuel discharged to return to the pump inlet. The valve continues to open wider until the pump discharge pressure is reduced to a value which just balances the force of spring 231. Therefore the pump discharge pressure is held at a substantially constant value.

The opposite end of rotor 228 is drivingly connected to a shaft 232, which turns in a bearing 234 in the housing 213. A collar 236 is threaded on the right end of shaft 232. Another collar 238 surrounds the shaft 232 between collar 236 and bearing 234. A flexible diaphragm 240 is clamped between the collars 236 and 238. The outer edge of diaphragm 240 is clamped between a pair of rings 242 and 244, which are press fitted together in nesting relationship. The left end of the ring 244 has a sliding contact with a stationary seal ring 246. The diaphragm 240, and the running seal together prevent leakage of fluid along the outside of shaft 232. A spring 248 is retained between the collar 236 and the ring 244 to maintain the running seal surfaces in engagement.

A piston rod 250 is provided with a squared end 252 slidable in a square recess at the axis of shaft 232. The other end of rod 250 is attached to a piston 253. The rod 250—252 and the piston 253 continuously rotate with the shaft 232. The piston 253 is provided with a skirt 254 which is slotted, as at 256, to provide fluid communication between the chamber 274 at the right end of piston 253 and a plurality of ports 260 which extend through to the wall of the cylinder 258 in which the piston 253 rotates.

A spring 262 retained between the collar 236 and the piston 252 biases the latter for movement to the right, in a direction such that the end of the slot 256 tends to close the ports 260.

Fluid entering the distributor 214 for distribution thereby passes from conduit 218 into a cylinder 264. A piston 266 is movable within the cylinder 264. A fixed restriction 268 provides fluid communication between the opposite sides of the piston. The lower edge of the piston 266 serves as a valve to control the area of a number of ports 270. The ports 270 pass through the walls of the cylinder 264 and lead to a recess 272 which communicates with the chamber 274 on the right hand side of piston 253.

Another piston 276 is located in the cylinder 264. The piston 276 is biased upwardly by a spring 278. Another spring 280 is retained between the upper surface of the piston 276 and the lower surface of the piston 266. The space under the piston 276 is subject to the pressure in the conduit 212, to which it is connected.

It may be seen that fluid entering the distributor 214 flows through conduit 218, cylinder 264, restriction 268, ports 270, recess 272, chamber 274, and out through the ports 260 to the respective cylinders of the engine. The quantity of fluid discharged through the ports 260 depends upon the pressure available in the chamber 274 to act on the piston 252 and compress the spring 262. That pressure is controlled by the piston 266 which acts as a valve to control the area of the ports 270. The piston 266 is positioned by the pressure drop across restriction 268, which pressure drop is opposed by spring 280. The pressure drop across restriction 268 is a measure of the rate of flow of fluid through that restriction. For any given setting of the spring 280 the piston 266 will assume a position where the fluid flow through restriction 268 and ports 270 is just enough so that the pressure drop across restriction 268 balances the force of spring 280. The force of spring 280 and hence the rate of flow of fluid through the distributor 214 is determined by the pressure in conduit 212, which acts on the piston 276 to set the position of the lower end of spring 280. The amount of fluid discharged to the engine by the distributing mechanism 214 is therefore proportional to the pressure in conduit 212.

A restriction 282 is shown in each of the ports 260. These restrictions are removable, and may be utilized to increase the amount of fluid flow to one or more of the cylinders relative to the amount supplied to the other cylinders. It has been found that in a modern aircraft engine having a large number of cylinders, certain cylinders tend to run hot, either because of uneven cooling or because of the uneven fuel distribution to the cylinders. When this condition occurs the mechanism shown may be utilized to supply an additional amount of fluid to the cylinders which are running hot.

It is well known that an increase in the richness of the fuel and air mixture supplied to an engine will make the mixture burn at a lower temperature, and hence will lower the engine temperature. When the distributor is used to distribute fuel, the tank 216 may be one of the regular fuel tanks, or conduit 218 may be connected directly to conduit 136. Pump 217 may then be the usual engine fuel pump.

The device shown in Figure 3 may alternatively be used to supply an anti-knock fluid of some kind to the cylinders of the engine. For example, the fluid may be water or a water and alcohol mixture.

Operation

The pressure in chamber 154 of the fuel flow regulator 138 is a measure of the pressure in chamber 156, since the difference between these two pressures is the force of spring 155 which may be considered as being constant without appreciable error.

The pressure drop across the jet system 144 may be taken as a measure of flow of fuel to the engine, as long as the area of the metering restriction open to the flow of fuel remains constant. Since the pressure on the downstream of the jet system is maintained substantially constant by the regulator 148, the pressure on the upstream side of the jet system may itself be used as a measure of the fuel flow. Furthermore, as set forth above, the pressure in chamber 154 is a measure of the pressure in chamber 156, which is substantially the same as the pressure on upstream side of the jet system. Therefore the pressure of chamber 154 may be used as a measure of the rate of fuel flow to the engine. The pressure of chamber 154 is transmitted through conduits 162 and 164 to chamber 166 in the fuel meter 114.

The valve 134 in the fuel meter 114 is positioned in accordance with the difference between two pressure differentials. The air pressure differential acting downwardly on diaphragm 130 is a measure of the rate of flow of air to the engine, and the fuel pressure differential between chambers 166 and 170, which acts upwardly on the valve 134, and is a measure of the rate of fuel flow to the engine. The position of valve 134 determines the pressure in chamber 166 and hence the pressure in chamber 154 and thereby the rate of fuel flow. It may therefore be seen that the fuel meter 114 acts to maintain a constant ratio between the fuel flow and the air flow. This ratio may, of course, be varied by operation of the mixture control valve 178, or by opening of enrichment valve 188, which occurs at high fuel pressure differentials. Furthermore, since the fuel pressure in conduit 162 is communicated through conduit 212 to the fluid distributor 214, it may be seen that the amount of fluid distributed directly to the cylinders is maintained proportional to the rate of flow of air to the engine, and hence, for a given open area of the fuel metering restriction, proportional to the rate of flow of fuel to the engine.

There is illustrated in Figure 4 a discharge nozzle which may be used with the distributor system of Figure 1. This nozzle is shown as being mounted in a casting 300, which may be part of either a cylinder head or air intake manifold. The nozzle receives fuel through a supply line 302 which may correspond to the supply line 220 of Figure 1. The line 302 connects with a chamber 304. The nozzle includes a valve head 306 and a stem 308. The stem is provided with a central passage, so that the upper end of the stem is subject to the same pressure as the lower end. A spring 312 biases the valve head 306 to closed position. The stem is fluted as at 314 to provide a fluid communication between the chamber 304 and a chamber 316 in back of the head 306.

It may be seen that when fuel is supplied under pressure to the line 302 this pressure is communicated through the flutes 314 to the chamber 316, where it acts on the head 306 in an opening direction. As the valve 306 opens, the pressure in chamber 316 is relieved. If the pressure in the line 302 increases, the valve will open wider, compressing the spring 312 more, and relieving the increased pressure. It may therefore be stated that the pressure in line 302 is maintained substantially constant at a value determined by the strength of spring 312.

The terms and expressions which I have employed are used as terms of description and not of limitation, and I have no intention in the use of such terms and expressions, of excluding any equivalent of the features shown and described or portions thereof, but recognize that various modifications are possible within the scope of the invented claims.

I claim as my invention:

1. Fluid flow control apparatus comprising a pump having a rotor, a valve, a stem for said valve aligned with said rotor, a port cooperating with said valve so as to have its area varied by reciprocation of said valve, means connecting said stem to said rotor for concurrent rotation therewith but permitting reciprocation of said stem and valve relative to said rotor, means for conveying fluid discharged by said pump to said valve, and means for reciprocating said valve to vary the flow of fluid therethrough.

2. Fluid flow control apparatus comprising a pump having a rotor, a valve, a stem for said valve, a port coöperating with said valve so as to have its area varied by reciprocation of said valve means for connecting one end of said rotor with a source of mechanical energy to cause rotation thereof, means for connecting the other end of said rotor with said stem to cause concurrent rotation of said valve, means for conveying fluid discharged by said pump to said valve, and means for reciprocating said valve to vary the flow of fluid therethrough.

3. Fluid flow control apparatus comprising a pump having a rotor, a valve, a stem for said valve aligned with said rotor, a port cooperating with said valve so as to have its area varied by reciprocation of said valve, means connecting said stem to said rotor for concurrent rotation therewith but permitting reciprocation of said stem and valve relative to said rotor and means for conveying fluid discharged from said pump to said valve, said valve being translatable by the pressure of said fluid to vary the flow therethrough.

4. Fluid flow control apparatus comprising a pump having a rotor, a valve, a stem for said valve aligned with said rotor, a port cooperating with said valve so as to have its area varied by reciprocation of said valve, means connecting said stem to said rotor for concurrent rotation therewith but permitting reciprocation of said stem and valve relative to said rotor and means for conveying fluid discharged from said pump to said valve, said valve being translatable by the pressure of said fluid to vary the flow therethrough and means for applying an additional translating force to said valve to additionally control the flow of fluid therethrough.

5. Fluid flow control apparatus comprising a housing, a pump in said housing having a rotor, a valve in said housing, rotatable drive means in said housing for rotating said rotor to produce a pumping action, a connection between said drive means and said valve permitting translation of said valve relative to said drive means, said connection being effective to cause continuous rotation of said valve while said pump is running to prevent sticking of said valve, and means for conveying fluid discharged from said pump to said valve, said valve being translatable by the pressure of said fluid to vary the flow therethru.

6. Fluid flow control apparatus comprising a housing, a pump in said housing having a rotor, a piston valve in said housing, a port in said housing adjacent said valve, said piston valve being translatable to vary the flow thru said port, a rotatable drive shaft in said housing for rotating said rotor to produce a pumping action, a motion-transmitting connection between said drive shaft and said valve, to cause continuous rotation thereof while said pump is running and thereby to prevent sticking of said valve, means in said connection to permit translation of said valve during rotation thereof, and means for conveying fluid discharged from said pump to said valve, said valve being translatable by the pressure of said fluid to vary the flow therethru.

LEIGHTON LEE, II.

REFERENCES CITED

The following references are of record in the file of this patent:

UNITED STATES PATENTS

| Number | Name | Date |
|---|---|---|
| 2,391,174 | Lounsberry | Dec. 18, 1945 |